United States Patent
Parigot et al.

(10) Patent No.: US 10,658,110 B2
(45) Date of Patent: May 19, 2020

(54) CAPACITIVE BLOCK INCLUDING A HEAT SINK

(71) Applicant: Valeo Siemens eAutomotive France SAS, Cergy (FR)

(72) Inventors: Baptiste Parigot, Rueil Malmaison (FR); Alwin Moceri, Conflans Sainte-Honorine (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 16/553,673

(22) Filed: Aug. 28, 2019

(65) Prior Publication Data

US 2020/0075239 A1    Mar. 5, 2020

(30) Foreign Application Priority Data

Sep. 4, 2018 (FR) ...................... 18 57943

(51) Int. Cl.
*H01G 2/08* (2006.01)
*H01G 13/00* (2013.01)
*H01G 2/10* (2006.01)

(52) U.S. Cl.
CPC ............. *H01G 2/08* (2013.01); *H01G 2/103* (2013.01); *H01G 13/003* (2013.01)

(58) Field of Classification Search
CPC ......... H01G 2/08; H01G 2/103; H01G 13/003
USPC ...................................... 174/15.1
See application file for complete search history.

(56) References Cited

U.S. PATENT DOCUMENTS

| | | | |
|---|---|---|---|
| 7,522,403 B1* | 4/2009 | Rinehart | H01G 2/04 361/302 |
| 8,018,712 B2* | 9/2011 | Yang | H02G 5/005 361/328 |
| 9,484,154 B2* | 11/2016 | Honda | H01G 2/04 |
| 10,109,422 B2* | 10/2018 | Koyama | H01G 2/08 |
| 2006/0050468 A1* | 3/2006 | Inoue | H01G 2/04 361/328 |
| 2011/0007480 A1 | 1/2011 | Souda | |
| 2011/0102966 A1* | 5/2011 | Takeoka | H01G 2/08 361/301.3 |
| 2011/0317331 A1 | 12/2011 | Lee et al. | |
| 2014/0126107 A1* | 5/2014 | Yoda | H01G 4/38 361/303 |
| 2014/0307360 A1* | 10/2014 | Parkin | H01G 2/08 361/274.2 |

(Continued)

OTHER PUBLICATIONS

Search Report from French Intellectual Property Office on co-pending FR application (FR1857943) dated Jul. 1, 2019.

*Primary Examiner* — Timothy J Thompson
*Assistant Examiner* — Michael F McAllister
(74) *Attorney, Agent, or Firm* — Klein, O'Neill & Singh, LLP

(57) ABSTRACT

The invention relates to a capacitive block, notably for an electrical equipment, comprising a case, a capacitive element housed in the case, a substance filling the space between the case and the capacitive element so as to ensure leak tightness of the capacitive element, a heat sink against which the capacitive element is in direct contact. In the capacitive block, the heat sink is different from the filling substance, a face of said heat sink, designated free face, forming an outer face of the capacitive block and being devoid of said filling substance.

10 Claims, 2 Drawing Sheets

(56) References Cited

U.S. PATENT DOCUMENTS

2014/0321090 A1* 10/2014 Guerin .................... H01G 9/26
                                                                  361/782
2018/0019062 A1* 1/2018 Okuzuka ................ H01G 2/106

* cited by examiner

CAPACITIVE BLOCK INCLUDING A HEAT SINK

TECHNICAL FIELD

The present invention relates to a capacitive block, notably for an electrical equipment, for example on board an automobile vehicle. Such an electrical equipment may be an inverter, a voltage converter or an electric battery charger.

PRIOR ART

Typically, while in operation, a capacitance is subjected to temperature variations which, when it is surrounded by air, can cause condensation of humidity from the surrounding air. Such a formation of water by condensation can impede the correct operation of the capacitance. A leak tight arrangement is thus necessary. In general, the capacitance is immersed in a polymerisable resin. Such a resin is poured in a fluid state around the capacitance, then polymerised to take a solid state. Such a polymerisation may be carried out by heat in an oven. Thus, the resin completely surrounds the capacitance in a leak tight manner. This resin is also an electrical insulator.

Furthermore, capacitances are components used in on board inverters, voltage converters or electrical chargers. In particular in electric or hybrid vehicle applications, the electrical currents may have high intensities. The generation of heat by Joule effect may then become important at the risk of damaging the capacitance. In order to avoid any degradation by heat, a system for cooling the capacitor is necessary. Such a system is known from the patent application publication US2010/0259898, in which thermal dissipation from the capacitor is achieved through the resin. Unfortunately, in a context of electric or hybrid vehicle, the resin does not have sufficient thermal conductivity. For example, a resin has a thermal conductivity comprised between 0.5 W/m·K and 1 W/m·K. Consequently, heat cannot be dissipated in a rapid and efficient manner.

An efficient cooling system for capacitances is thus sought, notably a way of dissipating heat from the capacitor in a rapid and efficient manner.

GENERAL DESCRIPTION OF THE INVENTION

To this end, the present invention relates to a capacitive block, notably for an electrical equipment, comprising:
 a case,
 a capacitive element housed in the case,
 a substance filling the space between the case and the capacitive element so as to ensure leak tightness of the capacitive element,
 a heat sink against which the capacitive element is in direct contact,
 capacitive block in which the heat sink is different from the filling substance, a face of said heat sink, designated free face, forming an outer face of the capacitive block and being devoid of said filling substance.

Thus, in the capacitive block according to the invention, thermal dissipation does not occur through the filling substance, but through a heat sink directly in contact with the capacitive element. The capacitive block thus dissipates heat more efficiently than in the prior art. Notably, the capacitive element is in direct contact with the heat sink. In other words, the capacitive block is devoid of filling substance between the capacitive element and the heat sink. In particular, the filling substance is fluid during the filling of the case, then becomes solid after a polymerisation step. Notably the filling substance is a polymerisable substance, such as a polymerisable resin for example.

According to an aspect of the present invention, the heat sink has a thermal conductivity greater than that of the filling substance. Thus, the better thermal conductivity of the heat sink makes it possible to guide heat to a cooling circuit against which can come the free face of the heat sink, and thereby to accelerate thermal exchange compared to the prior art. Notably, the free face of the heat sink forms a smooth and flat surface configured to come against a corresponding face of a cooling circuit. Thus, the presence of air pockets is avoided between the heat sink and the cooling circuit against which comes the free face. The plate is for example metallic.

According to another aspect of the invention, the heat sink comprises a plate of which a face opposite to the capacitive element forms said free face of the heat sink.

According to another aspect of the present invention, the plate comprises two opposite faces connected by an edge extending transversally to these two faces. A face of the plate includes the free face of the heat sink. Notably, the face of the plate opposite to the free face is supported against the capacitive element, in particular directly or indirectly through a thermally conductive and dielectric layer different from the filling substance. According to another aspect of the present invention, the filling substance comes into contact with the edge of the plate. In other words, the filling substance comes against the thickness of the plate. The filling substance comes into contact with the edge of the plate in particular over a height greater than or equal to 2 mm from the face of the plate in contact with the capacitive element. Such a contact height of the filling substance over at least one portion of the thickness of the plate makes it possible to guarantee leak tightness around the plate and thereby avoid infiltration of humidity around the plate up to the capacitive element.

In particular, the heat sink and the capacitive element are maintained together by the solidified filling substance. This is notably the case when the filling substance is a polymerisable substance, such as a polymerisable resin for example. Thus, the filling substance contributes at least in part to maintaining together the heat sink and the capacitive element. Thus, the capacitive block forms a single handleable object.

According to another aspect of the invention, the filling substance extends to a height less than the height of the free face of the heat sink, said heights being defined with respect to a bottom of the case. In particular, "height" is taken to mean a distance measured from the bottom of the case in the direction of the stack of parts, notably in a direction along which the heat sink comes against the capacitive element, then a cooling circuit comes against the heat sink. Thus, when the capacitive block is brought against a cooling circuit, by a side including the free face of the heat sink, the free face comes against the cooling circuit, no extra height of filling substance prevents contact of the free face with the cooling circuit. Efficient thermal dissipation from the heat sink to the cooling circuit may thus be obtained.

According to another aspect of the present invention, the heat sink comprises a thermally conductive and dielectric interface layer. The interface layer forms a contact between the heat sink and the capacitive element. Notably, the interface layer is between the capacitive element and said plate. The dielectric character of the interface layer prevents a short circuit between the capacitive element and the plate of the heat sink, whereas its thermal conductivity enables efficient dissipation of heat. Notably, its thermal conductivity is greater than that of the filling substance. In particular, the interface layer is a sheet of dielectric material, preformed and transferred. According to another aspect of the present invention, the interface layer has an overextending portion around said plate. In other words, the interface layer juts out all around the plate of the heat sink. This is particularly advantageous when the plate is liable to create a short circuit with the capacitive element. The overextending portion of the interface layer prevents the creation of an electric arc between the capacitive element and the plate of the heat sink. The overextending portion increases the leakage path between the plate and the capacitive element.

According to another aspect of the present invention, the capacitive element comprises at least one electrical connection tab. The tab forms a contact face of the capacitive element with the heat sink. The tab electrically connects to an electrode of the capacitive element by a face opposite to its contact face. Thus, the electrical connection tab is directly in contact with the heat sink, which makes it possible to dissipate efficiently heat produced in the electrical connection tab. Moreover, the positioning of the connection tab on the same side as the heat sink makes it possible to limit a dimension of the capacitive block on a contiguous side.

According to another aspect of the present invention, the case includes a wall forming a bottom of the case. From the bottom of the case walls extend so as to form side walls of the case. The bottom and the side walls define a housing receiving the capacitive element. One face of the capacitive element, opposite to the bottom of the case, forms a face coming directly against the heat sink. The case thus serves as recipient for the capacitive element and the filling substance. The capacitive block is thereby electrically insulated and forms an element easy to integrate in an electrical equipment.

The invention also relates to an assembly including a capacitive block according to the invention, which is assembled with a cooling circuit. The cooling circuit is configured to receive a fluid configured to drain heat from the capacitive block. The free face of the heat sink comes against a face of said cooling circuit. The cooling circuit notably comprises channels configured to receive a cooling fluid, in particular a liquid, so as to cool the capacitive block. The contact between the free face of the heat sink and the cooling circuit enables efficient heat dissipation.

According to an aspect of the invention, the free face of the heat sink is in direct contact with the cooling circuit.

According to another aspect of the invention, a second thermally conductive and dielectric interface layer is arranged between the free face of the heat sink and the cooling circuit. Notably, the second interface layer is inserted between said plate and a portion of the cooling circuit against which the plate is supported. In particular, the interface layer is a sheet of insulating and dielectric material, preformed and transferred. Alternatively, the interface layer may be a substance, for example a thermal grease, having a thermal conductivity greater than that of the filling substance.

Alternatively, the second interface layer may be a substance, such as for example a thermal grease, having a thermal conductivity greater than that of the filling substance.

The present invention also relates to a method for assembling a capacitive block including:
  the positioning of a capacitive element in a case through an opening of the case,
  the positioning of a heat sink against a face of the capacitive element facing said opening of the case,
  the deposition of a filling substance ensuring leak tightness of the capacitive element by filling the space between the capacitive element and the case, with the exception of a zone including a face of the heat sink, designated free face, which is opposite to the capacitive element and which forms an outer face of the capacitive block.

The assembly method ensures, on the one hand, leak tightness of the capacitive element and, on the other hand, it enables the integration of a heat sink in the capacitive block, this heat sink including a free face, ready to be assembled to a cooling circuit.

BRIEF DESCRIPTION OF THE DRAWINGS

The invention will be better understood and other details, characteristics and advantages of the invention will become clear on reading the following description given as a non-limiting example while referring to the appended figures in which.

DETAILED DESCRIPTION OF THE INVENTION

Figure 1:
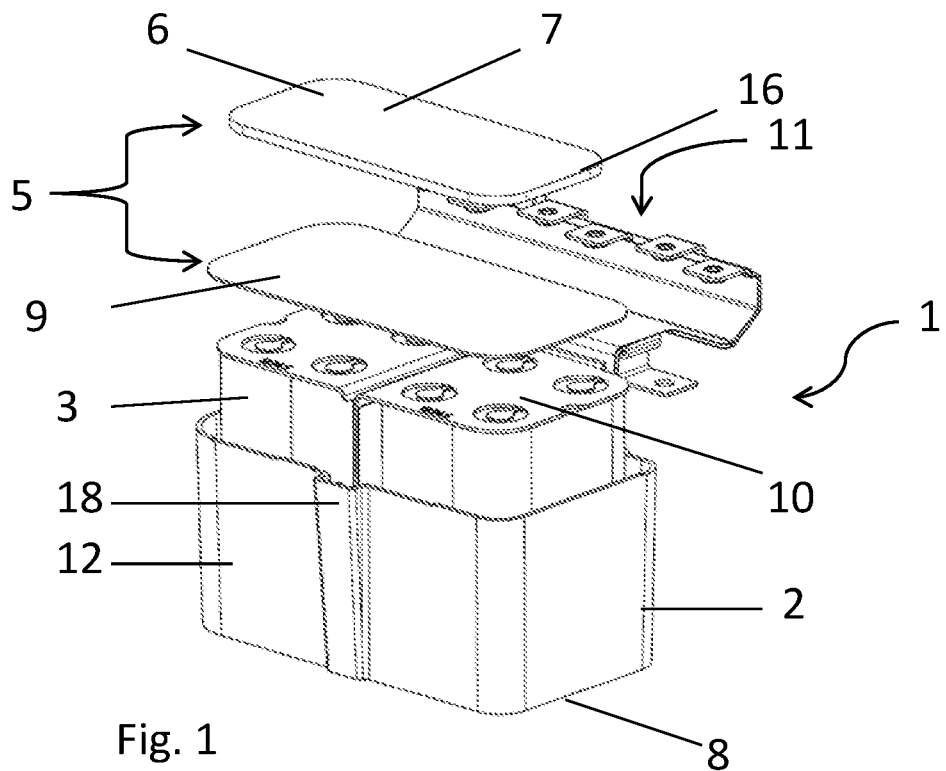
FIG. 1 illustrates an exploded view of an example of capacitive block according to the invention.
Figure 2:
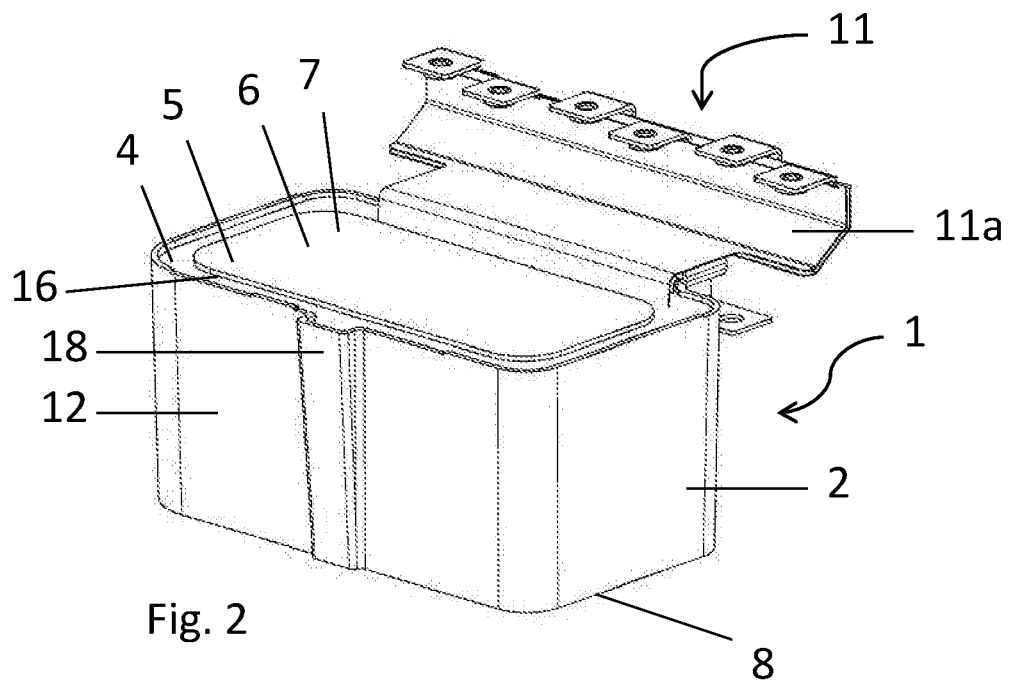
FIG. 2 illustrates a perspective view of the capacitive block of FIG. 1.
Figure 3:
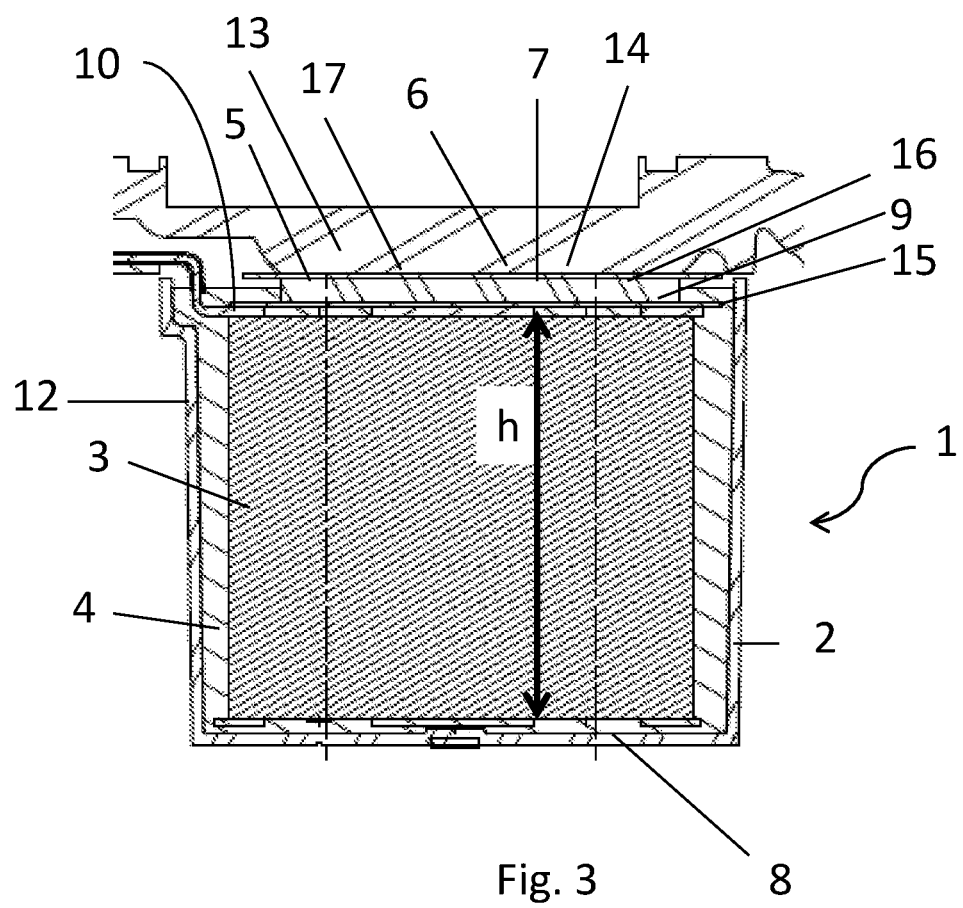
FIG. 3 illustrates a sectional view of the capacitive block of FIG. 1 arranged to a cooling circuit.

The capacitive block 1, such as illustrated by FIGS. 1 to 3, comprises a case 2 and a capacitive element 3, housed in the case 2, a substance 4 filling the space between the case 2 and the capacitive element 3 so as to ensure leak tightness of the capacitive element 3, and a heat sink 5 against which the capacitive element 3 is in direct contact. The heat sink 5 is different from the filling substance 4. The heat sink 5 also comprises a face, designated free face 6, which forms an outer face of the capacitive block 1 and which is devoid of the filling substance 4.

In the example represented, the heat sink 5 has a thermal conductivity greater than that of the filling substance 4. Thus, the better thermal conductivity of the heat sink 5 makes it possible to guide heat to a cooling circuit 13 against which can come the free face 6 of the heat sink 5.

Compared to the prior art, thermal exchange is thus improved. Notably, the free face 6 of the heat sink 5 forms a smooth and flat surface configured to come against a corresponding face of the cooling circuit 13. Thus, the presence of air pockets is avoided between the heat sink 5 and the cooling circuit 13 against which comes the free face 6. The plate 7 is for example metallic.

Thus, in the capacitive block 1 according to the invention, thermal dissipation does not occur through the filling substance 4, but through the heat sink 5 directly in contact with the capacitive element 3. The capacitive block 1 thus dissipates heat more efficiently than in the prior art. Notably, the capacitive element 3 is in direct contact with the heat sink 5. In other words, the capacitive block 1 is devoid of filling substance 4 between the capacitive element 3 and the heat sink 5.

In particular, the filling substance 4 is fluid during the filling of the case 2, then becomes solid after a polymerisation step. Notably the filling substance 4 is a polymerisable substance, such as a polymerisable resin for example.

Indeed, its liquid state allows the filling substance 4 to be introduced into all the free space between the capacitive element 3 and the lower wall of the case 2. In order to ensure leak tightness, the filling substance 4 surrounds the capacitive element 3 at least over its entire height h.

In the example represented, the heat sink 5 may comprise a plate 7 of which a face opposite to the capacitive element 3 forms the free face 6 of the heat sink 5.

The plate 7 may comprise two opposite faces connected by an edge 16 extending transversally to these two faces. In particular, a face of the plate includes the free face 6 of the heat sink 5. Notably, the face of the plate opposite to the free face 6 is supported against the capacitive element, in particular directly or indirectly through a thermally conductive and dielectric layer 9 different from the filling substance 4.

The filling substance 4 notably comes into contact with the edge 16 of the plate 7. In other words, the filling substance 4 comes against the thickness of the plate 7. The filling substance 4 comes into contact with the edge 16 of the plate 7 in particular over a height greater than or equal to 2 mm from the face of the plate 7 in contact with the capacitive element 3. Thus, leak tightness around the plate 7 is ensured and infiltration of humidity around the plate 7 up to the capacitive element 3 is avoided.

In particular, the heat sink 5 and the capacitive element 3 are maintained together by the solidified filling substance 4. This is notably the case when the filling substance 4 is a polymerisable substance, such as a polymerisable resin for example. Thus, the filling substance 4 contributes at least in part to maintaining together the heat sink 5 and the capacitive element 3. Thus, the capacitive block 1 forms a single handleable object.

In the example represented, the filling substance 4 extends to a height less than the height of the free face 6 of the heat sink 5, said heights being defined with respect to a bottom 8 of the case 2. Thus, when the capacitive block 1 is brought against a cooling circuit 13, by a side including the free face 6 of the heat sink 5, the free face 6 comes against the cooling circuit 13, no extra height of filling substance 4 prevents contact of the free face 6 with the cooling circuit 13. Efficient thermal dissipation from the heat sink 5 to the cooling circuit 13 may thus be obtained.

The heat sink 5 may comprise a thermally conductive and dielectric interface layer 9. The interface layer 9 forms a contact of the heat sink 5 with the capacitive element 3. Notably, the interface layer 9 is inserted between the capacitive element 3 and said plate 7. The dielectric character of the interface layer 9 prevents a short circuit between the capacitive element 3 and the plate 7 of the heat sink 5, whereas its thermal conductivity enables efficient heat dissipation. Notably, its thermal conductivity is greater than that of the filling substance 4. In particular, the interface layer 9 is a sheet of insulating and dielectric material, preformed and transferred. In an alternative, the interface layer 9 may be a thermal substance, having a thermal conductivity greater than that of the filling substance 4. The interface layer 9 may be a thermal grease, applied on the capacitive element 3 or on the plate 7 of the heat sink 5.

According to an alternative, the interface layer 9 has an overextending portion 15 around the plate 7. In other words, the interface layer 9 juts out all around the plate 7 of the heat sink 5. This is particularly advantageous when the plate 7 is liable to create a short circuit with the capacitive element 3. The overextending portion 15 of the interface layer 9 prevents the creation of an electric arc between the capacitive element 3 and the plate 7 of the heat sink 5.

Notably, the capacitive element 3 comprises at least one electrical connection tab 10. The tab 10 forms a contact face of the capacitive element 3 with the heat sink 5. The tab 10 electrically connects to an electrode of the capacitive element 3 by a face opposite to its contact face. Thus, the electrical connection tab 10 is directly in contact with the heat sink 5, which makes it possible to dissipate efficiently heat produced in the electrical connection tab 10. Moreover, the positioning of the connection tab 10 on the same side as the heat sink 5 makes it possible to limit one dimension of the capacitive block 1 on a contiguous side. The tab 10 is notably a part of an electrical connection bar 11. The electrical connection bar 11 enables an electrical connection of the capacitive block to other electrical elements, notably to an electronic power module. The electrical connection bar 11 notably includes a part 11a configured to come against terminals of other items of electrical equipment. In particular, this part 11a is positioned in an offset manner with respect to the contact face 6 of the heat sink 5, notably with respect to the plate 7, in order not to impede contact between the heat sink 5, notably the plate 7, and the cooling circuit 13.

In particular, the shape of the case 2 is adapted to the outer shape of the capacitive element 3. The example illustrated shows a case 2 in the form of a cuboid with rounded angles. The case 2 notably includes a wall forming a bottom 8 of the case 2. From the bottom 8 of the case 2 walls 12 extend so as to form side walls 12 of the case 2. The bottom 8 and the side walls 12 define a housing receiving the capacitive element 3. A face of the capacitive element 3, opposite to the bottom 8 of the case 2, forms the face coming directly against the heat sink 5. The case 2 thus serves as recipient for the capacitive element 3 and the filling substance 4. The capacitive block 1 is thereby electrically insulated and thus forms an element easy to integrate in an electrical equipment. However, the case 2 could have another shape as a function of the shape of the capacitive element 3. The shape of the case 2 makes it possible to receive entirely the capacitive element 3 and a layer of the filling substance 4 over the entire height h of the capacitive element 3. In particular, the filling substance 4 surrounds the capacitive element 3 entirely, notably between the capacitive element 3 and the bottom 8 and side walls 12 of the case 2. The thickness of the layer of filling substance 4 is notably equal between the capacitive element 3 and the walls 12 of the case 2.

In order to facilitate the introduction of the filling substance in the fluid state into the case 2, the case 2 is provided with a protuberance 18 in one of the side walls 12. The protuberance 18 notably has the shape of an inclined notch.

In the example represented, the heat sink 5 may be at a distance from an inner wall of the case 2. When the capacitive block 1 is mounted in an electrical equipment, this makes it possible to limit the risk of the occurrence of a short circuit with a neighbouring component of the capacitive block 1 through a wall of the case 2.

FIG. 3 shows in section the arrangement of the capacitive block 1 to the cooling circuit 13. A second interface layer 17 may be arranged between the cooler 13 and the plate 7. This second interface layer 17 improves the contact of the surfaces of the cooling circuit 13 and the plate 7. This second interface layer 7 has characteristics similar to those of the first interface layer 9.

In an alternative, not represented, the free face 6 of the heat sink 5 may be provided with excrescences, notably forming cooling fins or pins. These excrescences penetrate directly into the cooling circuit 13 to be bathed by the cooling fluid. The excrescences are notably spread out over the whole free face 6 of the plate 7, with the exception of a flat strip on the periphery. The cooling circuit thus comprises an opening capable of surrounding the excrescences. The edge of this opening rests on the flat strip of the plate 7. The edge of the opening of the cooling circuit may have a groove, in which a seal is received. The seal ensures leak tightness of the assembly between the cooling circuit and the plate 7, in order to avoid any leakage of cooling fluid.

REFERENCES

Capacitive block 1
Case 2
Capacitive element 3
Filling substance 4
Heat sink 5
Free face 6
Plate 7
Bottom 8
First interface layer 9
Tab 10
Electrical connection bar 11
Side walls 12
Cooling circuit 13
Face of the circuit 14
Overextending portion 15
Edge 16
Second interface layer 17
Filling notch 18

The invention claimed is:

1. A capacitive block, notably for an electrical equipment, comprising:
   a case,
   a capacitive element housed in the case,
   a substance filling the space between the case and the capacitive element so as to ensure leak tightness of the capacitive element,
   a heat sink against which the capacitive element is in direct contact,
   capacitive block in which the heat sink is different from the filling substance,
   a face of said heat sink, designated free face, forming an outer face of the capacitive block and being devoid of said filling substance.

2. The capacitive block according to claim 1, in which the heat sink has a thermal conductivity greater than that of the filling substance.

3. The capacitive block according to claim 1, in which the heat sink comprises a plate of which a face opposite to the capacitive element forms said free face of the heat sink.

4. The capacitive block according to claim 1, in which the filling substance extends to a height less than the height of the free face of the heat sink, said heights being defined with respect to a bottom of the case.

5. The capacitive block according to claim 1, in which the heat sink comprises a thermally conductive and dielectric interface layer forming a contact of the heat sink with the capacitive element.

6. The capacitive block according to claim 5, in which the heat sink comprises a plate of which a face opposite to the capacitive element forms said free face of the heat sink and in which said interface layer has an overextending portion around said plate.

7. The capacitive block according to claim 1, in which the capacitive element comprises at least one electrical connection tab, said tab forming a contact face of the capacitive element with the heat sink and said tab electrically connecting to an electrode of the capacitive element by a face opposite to its contact face.

8. The capacitive block according to claim 1, in which the case includes a wall forming a bottom of the case, from which walls extend forming side walls of the case, said bottom and said side walls defining a housing receiving said capacitive element, and a face of the capacitive element opposite to the bottom of the case forming a face coming directly against the heat sink.

9. An assembly including the capacitive block according to claim 1, assembled with a cooling circuit which is configured to receive a fluid configured to drain heat from the capacitive block,
   said free face of the heat sink coming against a face of said cooling circuit.

10. A method for assembling a capacitive block including:
    the positioning of a capacitive element in a case through an opening of the case,
    the positioning of a heat sink against a face of the capacitive element facing said opening of the case,
    the deposition of a substance ensuring leak tightness of the capacitive element by filling the space between the capacitive element and the case, with the exception of a zone including a face of the heat sink, designated free face, which is opposite to the capacitive element and which forms an outer face of the capacitive block.

* * * * *